Figure 1:
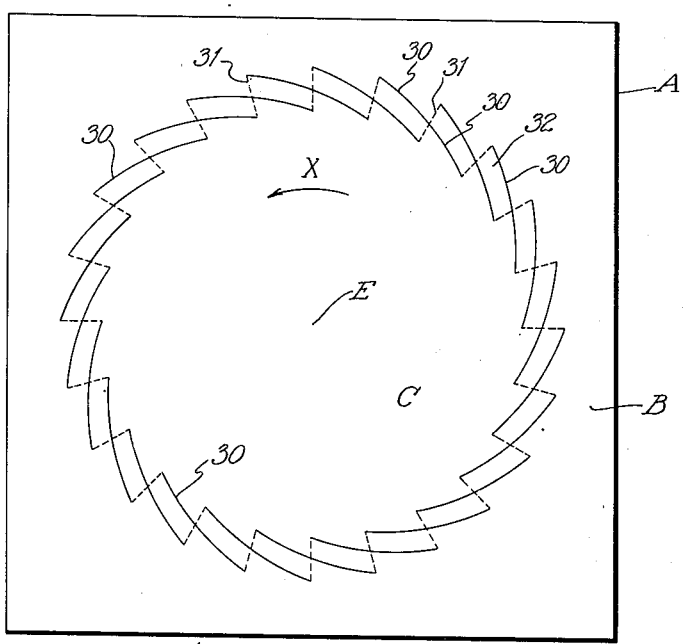

April 5, 1938.  R. E. PAIGE  2,113,432
DISPLAY DEVICE
Filed April 28, 1937  7 Sheets-Sheet 1

RICHARD E. PAIGE.
INVENTOR.
BY Ely Pattison,
ATTORNEYS.

WITNESS:

April 5, 1938.   R. E. PAIGE   2,113,432
DISPLAY DEVICE
Filed April 28, 1937   7 Sheets-Sheet 2

RICHARD E. PAIGE.
INVENTOR.
BY Ely & Pattison
ATTORNEYS.

WITNESS:

April 5, 1938.   R. E. PAIGE   2,113,432
DISPLAY DEVICE
Filed April 28, 1937   7 Sheets-Sheet 3

RICHARD E. PAIGE.
INVENTOR.
BY Ely Pattison,
ATTORNEYS.

WITNESS:

April 5, 1938.    R. E. PAIGE    2,113,432
DISPLAY DEVICE
Filed April 28, 1937    7 Sheets-Sheet 4
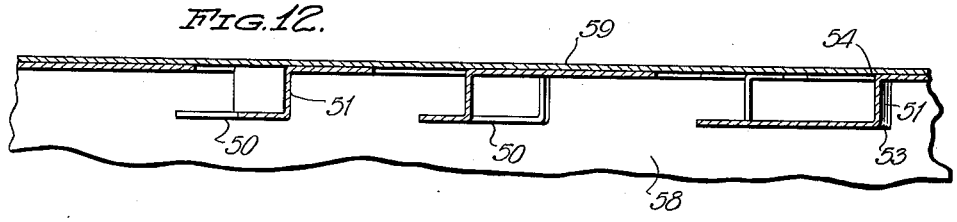
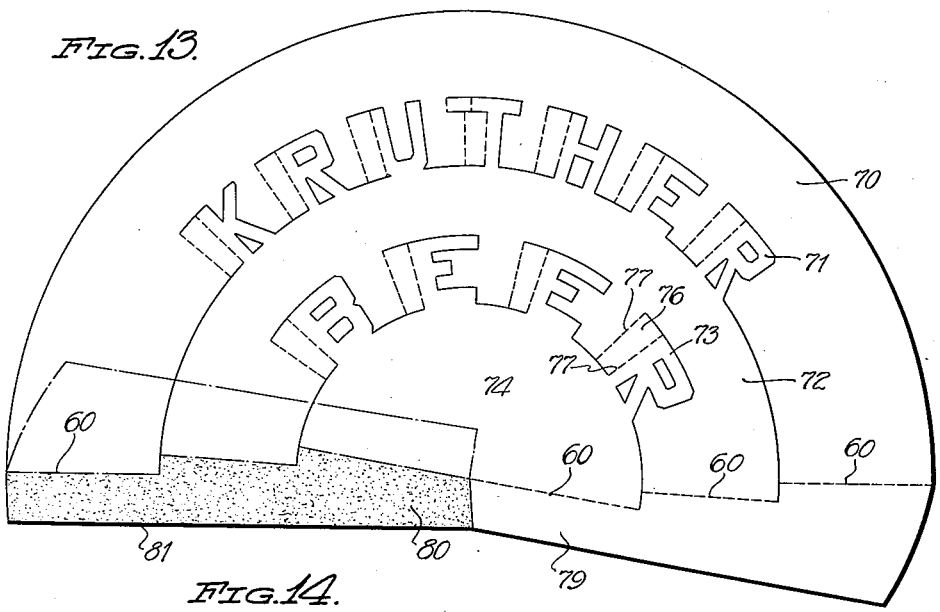
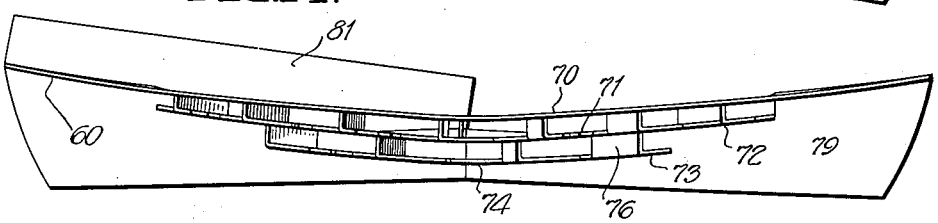
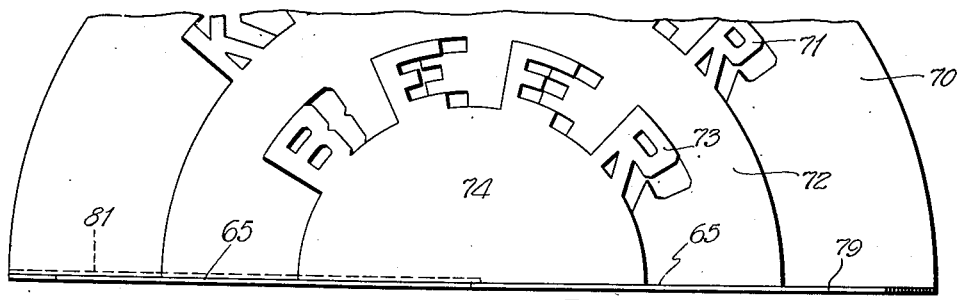
RICHARD E. PAIGE.
INVENTOR.
BY Ely Pattison
ATTORNEYS.
WITNESS:

April 5, 1938.　　　R. E. PAIGE　　　2,113,432
DISPLAY DEVICE
Filed April 28, 1937　　　7 Sheets-Sheet 5
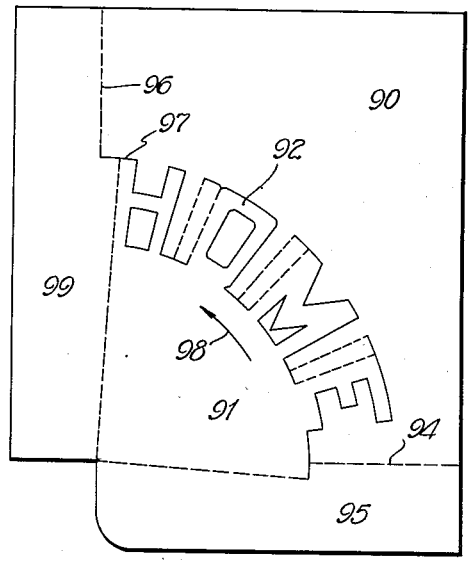
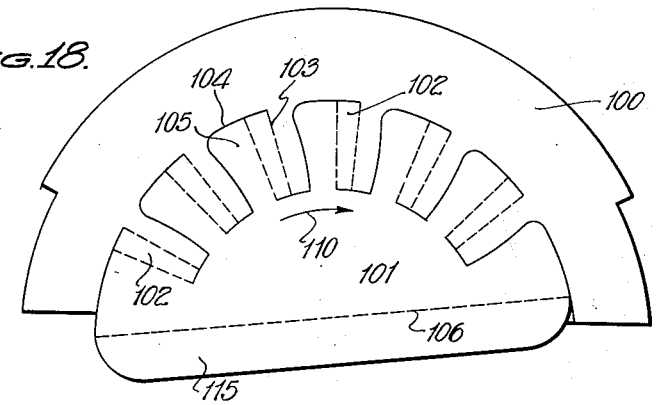
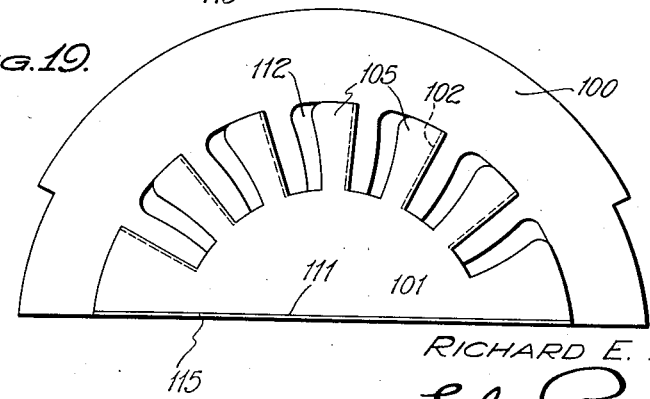
RICHARD E. PAIGE,
INVENTOR.

April 5, 1938. R. E. PAIGE 2,113,432
DISPLAY DEVICE
Filed April 28, 1937   7 Sheets-Sheet 6
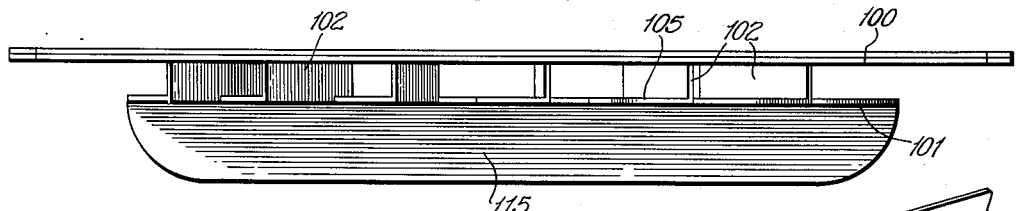
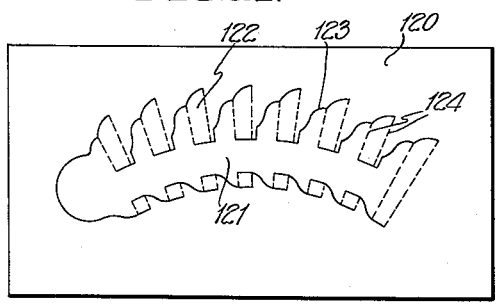
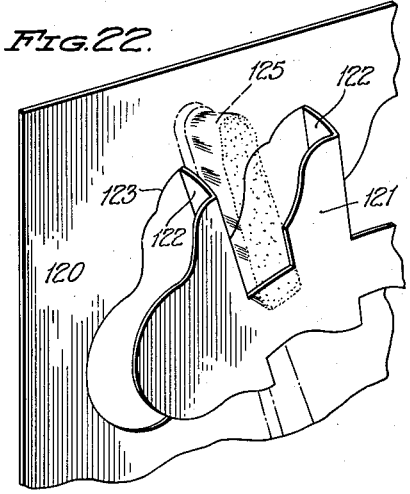
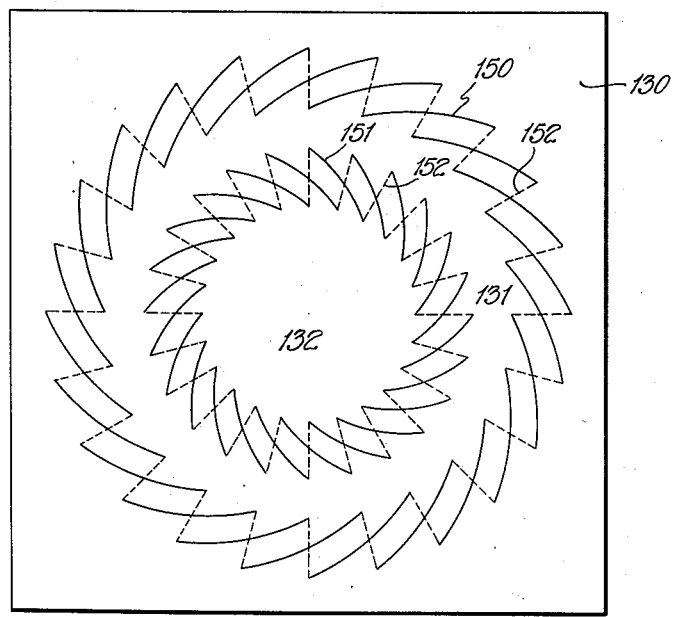
RICHARD E. PAIGE.
INVENTOR.

Patented Apr. 5, 1938

2,113,432

UNITED STATES PATENT OFFICE 2,113,432

DISPLAY DEVICE

Richard Eaton Paige, Flushing, N. Y.

Application April 28, 1937, Serial No. 139,397

17 Claims. (Cl. 40—126)

This invention relates to a new and improved method of making articles from blanks of foldable material and more particularly, the invention pertains to a new method of cutting and scoring a blank of foldable material whereby integrally connected sections thereof may be folded or moved to position in different planes and at the same time, maintain intact the integral connection between the sections.

The invention herein set forth has many diverse uses and is not, therefore, to be limited to the display devices herein illustrated since the invention has been employed by me in the formation of many other types of articles not even remotely related to display devices and in which the obtaining of ornamental effects was not the main object sought.

I am aware of the fact that articles such as described above are not, as broadly as stated, new. All such devices with which I am familiar, however, are constructed in a built up manner. That is to say, two or more suitably shaped elements are connected together and either held in spaced relation or permitted to move to planes in spaced relation, by connecting elements, the ends of which are glued or pasted to the members which they serve to connect. Furthermore, after such devices have been completely formed, while their sections may be movable to position in spaced planes, they are not capable of movement to position in a single plane.

While the desired effects obtained by my invention may possibly be obtained in the well known manner above described, the necessary die cutting and gluing operations attendant thereto, are expensive and render such method prohibitive in the construction of certain articles, the manufacturing cost of which must be kept within certain limitations.

I have discovered, as will hereinafter become apparent, a new and novel method of operation or manipulation of cardboard, paper and in fact any foldable material, whereby certain articles of the afore-mentioned type, i. e., in which there are two or more sections or display areas disposed in spaced planes when the device is in its extended position and which, when the device is in its knocked down position, will lie flat with all of its sections in a single plane, may be constructed from a single blank of such material. Furthermore, in the practicing of my method, I employ no gluing or pasting operations, the article resulting from my method having all of its component parts integrally connected as distinguished from the several parts which are glued or pasted together in the built up device resulting from the well known method of manufacture above mentioned.

By my improved method of manipulation, I am able to obtain effects impossible of attainment by the old method above described. One, and probably the most apparent effect which I am able to obtain, is the bringing into visible position upon either side of the blank from which the display device is formed, portions of the reverse face to that being viewed by an observer. Such a result is impossible of attainment by the old and well known method afore-mentioned.

Another important feature of my invention resides in the fact that the movable sections of my device are movable relatively to each other without contracting or otherwise reducing the original size of the blank from which they are formed.

Although, as above stated, my invention is applicable to a wide variety of articles, it is particularly applicable to display devices since, in that it is capable of manufacture at a minimum cost of production, it will fold to a flat position for storing and shipping, and moves readily to its set up or display position, it highly recommends itself to such use.

A still further result which I am able to obtain is the production of a display device which has display qualities of a highly pleasing nature when viewed from either face thereof. In fact, except for the manner in which the device may be printed or otherwise ornamented, my display has no reverse side or face. For example, my device may be printed or otherwise ornamented upon both of its faces and either face displayed to view at will. Such a method of use is not possible with any other display device with which I am familiar.

Figure 2:
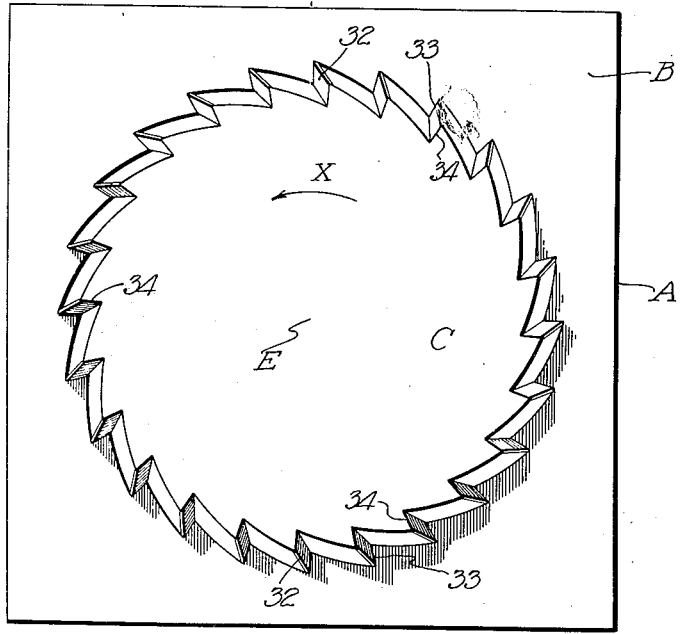
Figure 3:
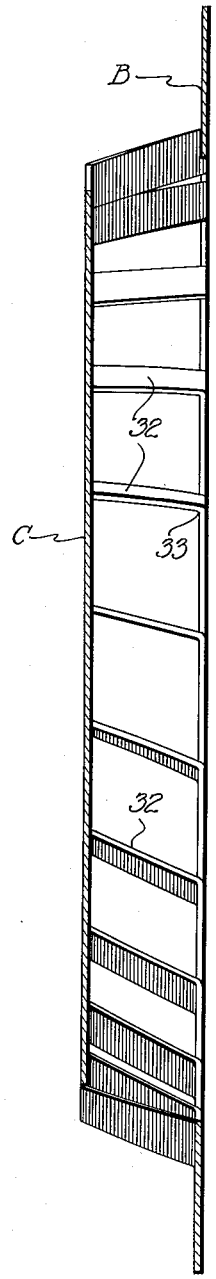
Figure 4:
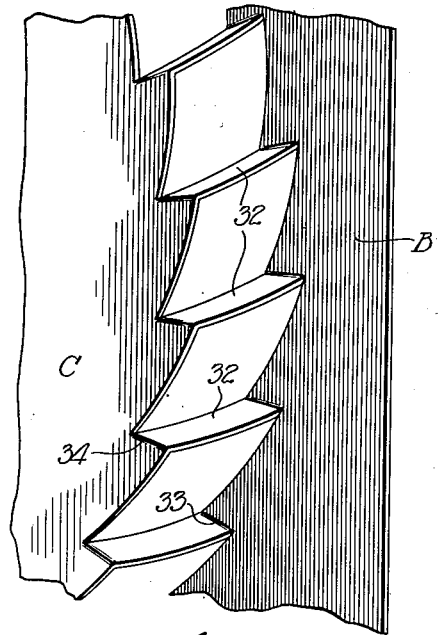
Figure 5:
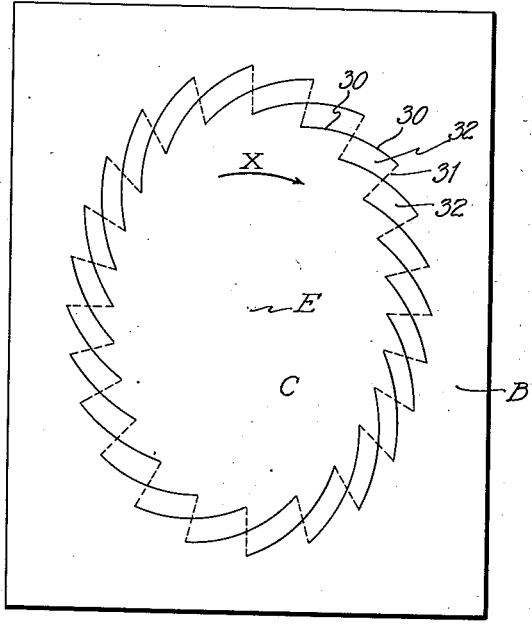
Figure 6:
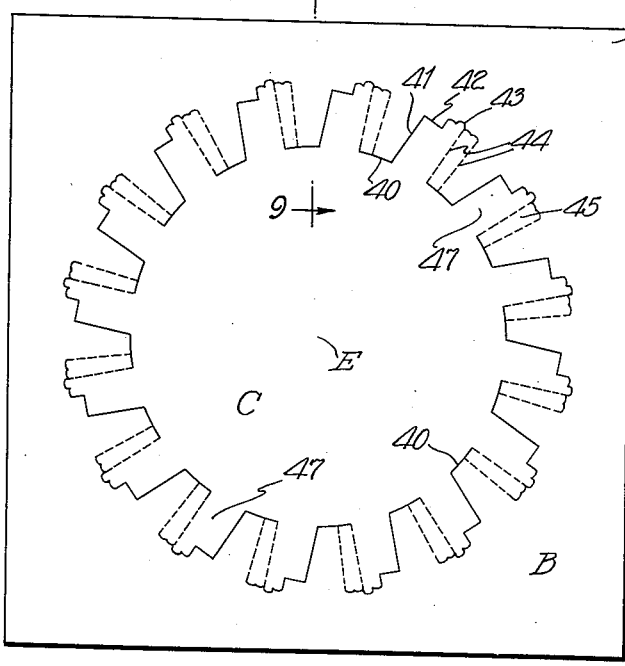
Figure 7:
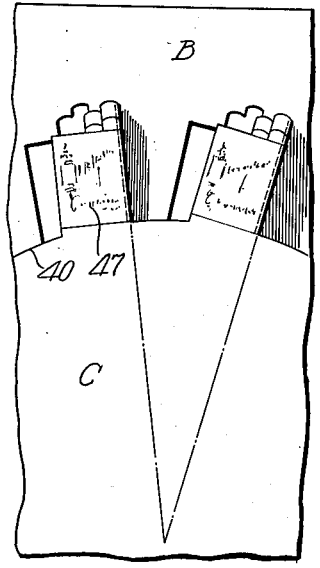
Figure 8:
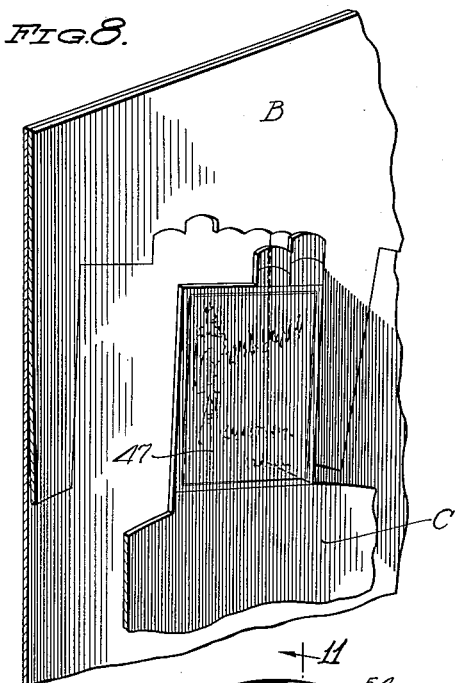
Figure 9:
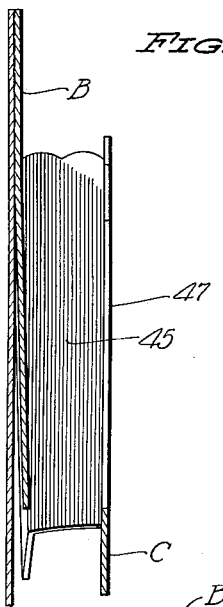
Figure 10:
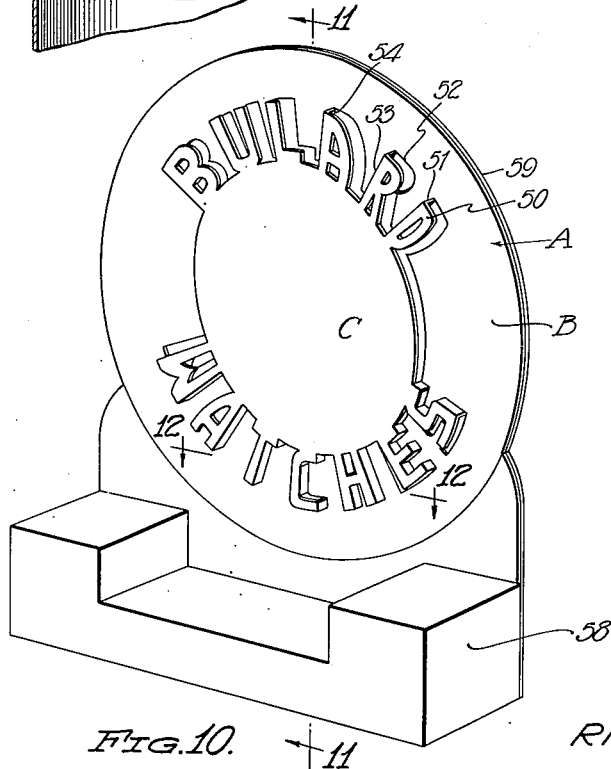
Figure 11:
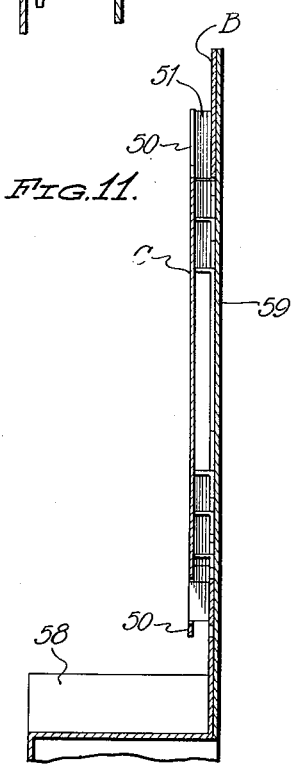
Figure 24:
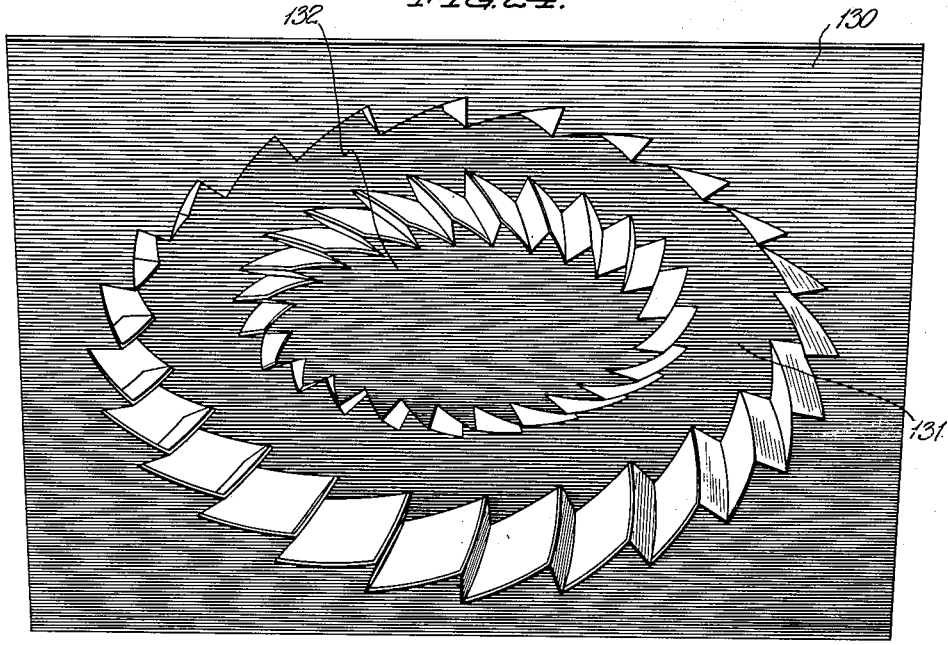
Figure 25:
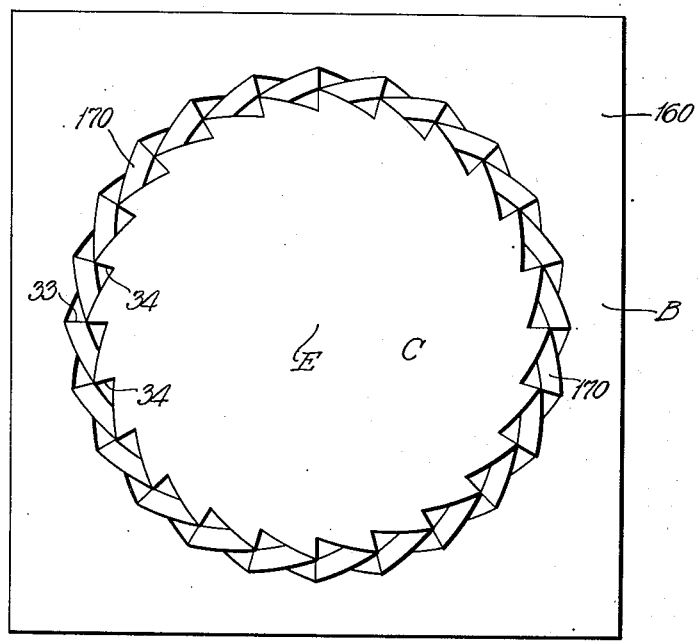

Many other advantages will become apparent as the nature of my invention is better understood for which purpose, reference will be had to the following specification and claims and the accompanying drawings, wherein I have illustrated only a few of the various forms of display devices in which my invention may be practiced, and in which:

Figure 1 is a plan view of a blank illustrating the manner in which the blank is treated to construct a device in accordance with the present invention, Figure 2 is a plan view illustrating a device constructed from the blank as treated in Figure 1, Figure 3 is a sectional view on an enlarged scale taken substantially on the line 3—3 of Figure 2, Figure 4 is a detail perspective view on a still larger scale illustrating the position of the parts when the device is in its set up position, Figure 5 is a plan view of a blank showing a slightly modified form over that illustrated in Figures 1 to 4, Figure 6 is a plan view of still another form of blank, Figure 7 is a detail fragmentary plan view on an enlarged scale illustrating a section of the set up device as formed from the blank illustrated in Figure 6, Figure 8 is a detail fragmentary sectional view partly in perspective illustrating the form of the invention shown in Figures 6 and 7 showing a backing up element placed upon the device, Figure 9 is a detail sectional view on an enlarged scale taken substantially on the line 9—9 of Figure 6, Figure 10 is a perspective view of a still further modified form of the invention, Figure 11 is a vertical sectional view taken substantially on the line 11—11 of Figure 10, Figure 12 is a horizontal fragmentary sectional view taken substantially on the line 12—12 of Figure 10, Figure 13 is a plan view of a blank showing still a further modified form of the invention, Figure 14 is a top plan view of a device constructed in accordance with that form of the invention illustrated in Figure 13, the device being in its set up position, Figure 15 is a fragmentary elevational view of that form of the invention illustrated in Figures 13 and 14, Figure 16 shows a blank treated to provide still a further modified form of the invention, Figure 17 is a view in elevation of that form of the invention illustrated in Figure 16, the device being in its set up position, Figure 18 is a plan view of a blank showing still a further modified form of the invention, Figure 19 is a view in elevation of that form of the invention illustrated in Figure 18 in its set up form, Figure 20 is a top plan view of the device illustrated in Figures 18 and 19 in its set up form, Figure 21 is a plan view illustrating a still further modified form of the invention, Figure 22 is a detail fragmentary perspective view on an enlarged scale illustrating that form of the invention shown in Figure 21, Figure 23 is a plan view of a blank illustrating still a further modified form of the invention, Figure 24 is a plan view showing that form of the invention illustrated in Figure 23 in its set up position, and;

Figure 25 is a plan view illustrating the manner in which the parts which constitute the devices may be moved to a position in which portions of both sides of the blank are visible from either side thereof.

Referring specifically to the drawings, and particularly to Figures 1 to 4, inclusive, the reference character A designates a blank of any type of foldable material. One material which I have found highly satisfactory, particularly in the formation of display devices, is cardboard or heavy paper.

The blank is cut along a plurality of lines of cut designated 30. These lines of cut 30 divide the blank into two sections B and C. Intersecting the lines of cut 30 there are crease or score lines 31 and these crease or score lines connect the ends of certain of the lines of cut. In the present illustration of the invention, the crease or score lines 31 extend from the inner end of a line of cut to the outer end of another line of cut spaced from the line of cut to which the first mentioned end of the crease or score line is connected by an intervening line of cut. Thus, as heretofore stated, the crease or score lines each intersect a line of cut in this form of the invention.

The lines of cut designated 30, and the crease or score lines 31 divide the blank into a plurality of connecting elements 32, which connecting elements are integrally connected at one end to the section B and at the opposite end to the section C of the blank. These connecting elements also provide spacers for spacing the sections B and C with respect to each other when they are moved into spaced planes as will be hereinafter described.

With the blank cut and creased or scored, as above described, it is only necessary to exert pressure upon the rear face of the section C, as viewed in the drawings, whereupon the section C will move axially in the direction of the arrow X in said drawings. In its axial movement, the section C will move to a plane in spaced relation with respect to the plane of the section B and in so moving, the crease or score lines 31 serve as hinge points or lines of fold upon which the connecting members 32 hinge to permit of this relative movement of the sections B and C. It is to be understood that the crease or score lines which are designated 33 in Figures 2 and 3 of the drawings are score lines made upon the rear face of the blank as it is viewed in the drawings, while the crease or score lines designated 34 in Figure 2 of the drawings are crease or score lines which are made upon the front face of the blank as viewed in the drawings.

It is to be noted that the lines of cut designated 30 are, in the illustrated form of the invention, curved or arcuate in form and are arranged in a circular series, the axis of which may be designated E in the drawings, and it is also to be noted that the crease or score lines, heretofore mentioned as intersecting the lines of cut, are angularly disposed with respect to each other and to the lines of cut and extend radially from the point D in the drawings.

By this arrangement and construction of parts the two sections are capable of axial movement relative to each other to position them in spaced planes, as illustrated in Figure 3, and further, the two sections are always connected by integral connecting members which are integral with both sections and which provide spacers to maintain the sections in their spaced relation.

In Figure 5 I have illustrated a modified form of my invention in which the arcuate or curved lines of cut are arranged in an oval formation, as distinguished from a circular formation, as in the heretofore described form. In this form of the invention the crease or score lines are radial, as in the heretofore described form, and the two sections of the blank are movable axially with relation to each other to position them in spaced planes at the same time maintaining the integral connection of the connecting members with said two sections.

In Figures 6 through 9, inclusive, I have shown another adaptation of the principle and in the said figures the blank A is divided into the two sections B and C by lines of cut designated 40, 41, 42, 43. The reference numeral 44 designates crease or score lines which divide the blank into connecting members 45 which are integrally connected to the sections B and C. There is a slight difference in this form of the invention as compared with the form heretofore described in that the crease or score lines 44 do not intersect lines of cut as in said previously described form but do instead, terminate at points spaced along the lines of cut. The manner in which the blank is cut in that form illustrated in Figures 6 to 9, inclusive, provides sections 47, which sections are herein depicted in simulation of packages of articles such as cigarettes.

In this form of the invention the two sections B and C are relatively movable in an axial direction to throw them in spaced planes and at the same time maintain them in integrally connecting relation, and while I have illustrated these sections 47 as simulating packages of cigarettes, it is obvious that by varying the shape or direction of the lines of cut, other articles may be formed and the invention is therefore, not to be limited to any particular formation of cut nor to provide articles of any specific type.

For example, in Figures 10 through 12, I have shown a form of the invention in which letters such as 50 are cut from the section B of the blank and are integrally connected with the inner section C thereof by connecting elements 51. To provide this type of device, the blank A is cut along the lines 52 and creased or scored along the lines 53 and 54 to divide the blank respectively into the inner and outer sections C and B, letters and connecting elements. In this form of the invention I have shown a suitable base or other support 58, and to prevent the appearance of open spaces, I have provided the entire device with a backing sheet or the like 59. The base 58 and the backing sheet 59 are, however, not necessary to the operation or construction of this device and are merely added to illustrate the fact that the device may be suitably supported and that the spaces caused by the ornamental sections displaced from the main body may be hidden or rendered less obvious.

In each of Figures 13 through 22 there is added a feature not disclosed in those forms of the invention heretofore discussed, and this feature will now be described.

It will be noted by reference to these figures that the entire blank is not circular in form. It is obvious that when constructed in circular form as set forth in Figures 1 to 12, inclusive, axial movement of the two or more sections does not necessarily change their relation other than positioning them in spaced planes. However, when the entire device is of less than circular form, for example, semi-circular, axial movement of the sections relative to each other to throw them into different planes would give an uneven line along the bottom since, if the bottom line were straight, on one side the bottom edge of the section would be moved beyond the bottom edge of the adjacent section and on the opposite side it would be moved above the bottom edge of the adjacent section. Therefore, in laying out such a device the blank is cut and creased or scored so that a greater portion thereof is positioned upon one side of a center line so that as the sections are moved relative to each other in an axial direction into spaced planes, they will even up along their bottom edges. This is illustrated in Fgures 13 through 19 of the drawings.

For example, by reference to Figure 13 the blank is substantially semi-circular, its radius line being designated by the reference character 60. By reference to Figure 13 it will be seen that the greater portion of the blank is disposed to the right of a center line. However, when the two sections are moved axially the sections will attain a straight line designated by the reference character 65 in Figure 15 and the device will be substantially semi-circular in form.

In Figure 14 I have illustrated to an exaggerated degree the fact that there is, in all forms of the invention as illustrated, a slight bowing of the blank. This results from the fact that the crease or score lines are radial and emanate from a common point, and consequently, the farther from this point they are located, the greater the space between them, and since they radiate and are therefore angularly disposed, the center portion of the device, or that portion closely adjacent the point from which the crease or score lines emanate, is naturally narrower than at points more remote therefrom, and inasmuch as these lines constitute the lines on which the folding takes place, it necessarily throws the two sections in angularly disposed spaced planes as illustrated in said Figure 14.

In Figures 13 to 15, inclusive, the device comprises five sections, namely, 70, 71, 72, 73, and 74. The sections 70, 72, and 74, are formed from the main body portion of the blank, while the sections 71 and 73 are in this instance, in the form of letters, which letters are connected to the next adjacent section to that from which they are formed by connecting members 76 formed by crease or score lines 77 upon which they fold to permit of the sections 70, 72, and 74 moving in the spaced planes. In this form of the invention the sections 71 and 73 may be other than letters if desired.

Also in this form of the invention I provide a supporting base which consists of two sections 79 and 80. The section 79 is preferably an integral part of the blank while the section 80 is a separate piece pasted or otherwise secured to the blank in such a manner that when the blank is folded, the section 79 and a portion of the section 80 will be positioned in front of the blank while a portion of the section 80 will be positioned behind the blank, and these sections 79, 80, and 81 will form a suitable support for the device in this set up form.

In Figures 16 and 17 I have illustrated a device formed from a rectangular blank which consists of two sections 90 and 91. From one of these sections, letters 92 which, of course, may take other forms, are cut from one section of the blank and connected to the other section of the blank by connecting members 93 similar to those heretofore mentioned. It will be noted by reference to Figure 16 that the section 91 extends below the bottom line 94 of the blank as at 95 and that the said section 91 also extends inwardly of the side 96 of the blank as at 97. This is done so that when the two sections 90 and 91 are moved axially with relation to each other as by moving the section 91 in the direction of the arrow 98 in Figure 16, the bottom sides and edges will be straight and the entire device will take on a true rectangular form. The portions 95 and 99 may or may not be removed and if left in position upon the blank may form a suitable support therefor to hold it in display position.

In Figures 18 through 22 I have shown an arrangement whereby the device may be employed for supporting articles, the articles being mounted or carried within pockets which are formed when the two sections of the blank are moved axially with relation to each other.

Referring to the above mentioned figures, the blank consists of an outer section 100 and an inner section 101. These sections are connected together by connecting elements 102 which are formed by crease or score lines 103, the sections 101 being formed by lines of cut 104. It will be noted that in this form of the device the bottom edge of the major central portion of the blank which is designated 106 is angularly disposed so that when the section 101 is moved in the direction of the arrow 110 in Figure 18, the bottom edges of the two sections will move into alinement with each other providing a straight bottom edge 111 for the blank as illustrated in Figure 19. This construction provides pockets or the like 112 which may receive various articles such as actual packages of cigarettes or any other articles which it may be desired to display, and if the blank is cut, as illustrated in Figure 18, and folded along the bottom line designated 106 in said figure, there will be provided a portion 115 which will act as a support for the device to retain it in display position.

Referring to Figures 20 through 22, substantially the same construction as that illustrated in Figures 18 through 20 is provided in a rectangular blank. In this form of the invention the blank consists of two sections 120 and 121 which are connected together by connecting elements 122, the blank being cut along the lines 123 and creased or scored along the lines 124 to provide these several sections, as best illustrated in Figure 22. This construction provides pockets or the like for the reception of articles to be displayed, a tooth brush, designated 125 in Figure 22 being shown by way of illustration, which articles will be held in display position and will also serve to maintain the two sections 120 and 121 of the blank in position in spaced planes.

In Figures 23 and 24 I have illustrated still a further modified form of the invention in which the blank is divided into three sections 130, 131, and 132. This form of the invention is substantially the same as that illustrated in Figures 1 to 4 of the drawings except that in that form illustrated in Figures 23 and 24 there are two circular series of cut lines designated 150 and 151 arranged one within the other in concentric relation. The ends of the lines of cut in each circular series are connected by crease or score lines 152, as heretofore described, and this form of the invention will position the three sections 130, 131, and 132 in three different planes when the sections are moved relatively in axial direction.

In Figure 25 the device is constructed in exactly the same manner as that in Figures 1 through 4. However, in Figure 25 of the drawings the section C has been rotated axially to such an extent that the connecting members which are, in said figure, designated 170, move to such a position that their reverse face is brought into view upon that face of the blank being viewed. This is accomplished merely by moving the sections axially with relation to each other through a greater distance in Figure 25 than has been done in Figures 1 through 4. It will be obvious that when the device is constructed in this manner portions of both sides of the blank are visible from either side thereof and this construction and arrangement of parts allow for a great latitude in the ornamentation of the device.

It will be noted that in each of the forms of the invention, as herein illustrated, the lines of cut are curved or of irregular form. It is to be understood, however, that this is not necessary since these lines might also, if desired, be straight instead of curved or of irregular form, the formation or shape of these lines not being important except to attain the desired design.

It will be noted that in each instance, the device, when in its knocked down form, has all of its sections which are integrally connected in the same plane. This is due to the fact that all sections are cut from a single blank and are disposed within the confines of said blank and are integrally connected. However, when the device is to be set up, the several sections are moved into spaced planes and they can be again moved into the same plane in order to provide a flat blank.

Such a construction renders the manufacture of certain devices of which display devices, picture frames, article holders, are but a few, relatively cheap and simple and also provides for the folding or knocking down of such devices into a relatively thin structure, thus greatly facilitating their storage and transportation. Furthermore, the invention eliminates entirely all intricacies in the setting up of the device since it is only necessary to move the members relatively to each other in an axial direction and the device automatically moves to its set up position or, if in set up position and such movement is imparted to the device, it will automatically move to its folded position requiring no special knowledge or skill upon the part of the operator.

From the foregoing it is apparent that the present invention provides a new and improved method of cutting, creasing or scoring and folding cardboard whereby articles having integrally connected sections in different planes may be constructed from a single blank of material and may be set up or knocked down at will. Furthermore, the invention permits of a wide field of decoration, since, depending upon the degree of axial movement given the members, portions of both sides of the blank from which the article is formed may be moved in position to be visible from either side thereof.

While in the present embodiment of the invention the device has been disclosed only as a display device, it is obvious that it has many other uses and the invention is not to be limited to the formation of such devices but may be employed in the manufacture of various other articles.

Having thus described the invention, what is claimed as new, is:

1. An article formed from a single blank of foldable material cut and scored to provide a plurality of integrally connected sections within the confines of the blank and to permit of relative axial movement of said integrally connected sections to position them in spaced planes.

2. A blank of foldable material cut along a plurality of relatively short arcuate lines arranged in a circular series to divide the blank into two integrally connected sections, straight crease or score lines intersecting said arcuately cut lines and providing lines of fold upon which the sections are relatively movable into spaced relation, and connecting elements integrally connecting said sections and holding the sections in spaced relation, said connecting elements being defined by said arcuate cut lines and the straight crease or score lines which intersect them.

3. A blank of foldable material cut along a plurality of relatively short lines arranged in a circular series to divide the blank into two integrally connected sections, and a plurality of radial crease or score lines intersecting said arcuate lines and providing lines of fold upon which the sections are relatively movable into spaced relation.

4. A blank of foldable material cut along a plurality of relatively short arcuate lines arranged in a circular series to divide the blank into two integrally connected sections, and a plurality of radial crease or scores lines intersecting said arcuate lines and providing lines of fold upon which the sections are relatively movable into spaced relation, said radial crease or score lines emanating from the axial center of the circular series of relatively short arcuate cut lines.

5. A blank of foldable material cut along a plurality of relatively short lines and creased or scored along a plurality of lines intersecting said lines of cut, said lines of cut and said crease or score lines dividing said blank into separate sections and connecting elements integrally connecting said sections, the crease or score lines providing lines of fold upon which the sections are axially movable into separate spaced planes.

6. A blank of foldable material cut along a plurality of relatively short lines and creased or scored along a plurality of lines intersecting said lines of cut, said lines of cut and said crease or score lines dividing said blank into a main body portion, a section within the confines of the main body portion, and a plurality of connecting members integrally connected to both the main body portion and the section, said crease or score lines providing for folding of the blank to move the internal section to a position either in the plane of the main body portion of the blank or into a plane spaced relatively to the main body portion of the blank.

7. A blank of foldable material cut along a plurality of relatively short lines and creased or scored along a plurality of lines intersecting said lines of cut, said lines of cut and said crease or score lines dividing said blank into a main body portion, a plurality of sections within the confines of the main body portion, and a plurality of connecting members, said crease or score lines providing for folding of the blank to move the internal sections to position either in the plane of the main body portion of the blank or in planes spaced with respect to the main body portion of the blank and to each other.

8. A blank of foldable material, a plurality of relatively short lines of cut and a plurality of crease or score lines intersecting said lines of cut, said lines of cut and said crease or score lines dividing said blank into separate sections and connecting elements integrally connecting said sections, the crease or score lines providing lines of fold upon which one of said sections is capable of axial movement to throw it into a plane in spaced relation with the remainder of the blank.

9. A display device comprising a blank of foldable material, a plurality of relatively short lines of cut and a plurality of crease or score lines intersecting said lines of cut, said lines of cut and said crease or score lines dividing said blank into separate sections and connecting elements integrally connecting said sections, the crease or score lines providing lines of fold upon which one of said sections is capable of axial movement to throw it into a plane in spaced relation with the remainder of the blank with the connecting elements holding said sections in said spaced planes.

10. A display device comprising a blank of foldable material, a plurality of lines of cut and a plurality of crease or score lines intersecting said lines of cut, said lines of cut and said crease or score lines dividing said blank into separate sections and connecting elements integrally connecting said sections, the crease or score lines providing lines of fold upon which the sections are relatively movable to position portion of both sides of the blank into a position of visibility upon one side of the blank.

11. The method of constructing articles having sections in spaced planes from a single blank of foldable material, which method consists in cutting a single flat blank of foldable material along a plurality of definitely related relatively short lines, creasing said blank along definitely related lines which intersect said lines of cut, and moving one of said sections axially upon the crease or score lines to position it in spaced relation to the remainder of the blank.

12. The method of constructing articles from a single integral blank of material and in which portions of both sides of the blank are visible upon one side thereof which method consists in cutting a single flat blank of foldable material along a plurality of definitely related relatively short lines, creasing said blank along definitely related lines which intersect said lines of cut, and moving one of said sections axially upon the crease or score lines a sufficient distance to expose to visibility portions of both sides of said blank upon one side thereof.

13. The method of constructing from a single blank of foldable material without reducing the dimensions of the blank, articles having a plurality of sections in spaced planes, which method consists in cutting a single flat blank of foldable material along a plurality of definitely related short lines, creasing or scoring said blank along definitely related lines to provide lines of fold which intersect said lines of cut, and moving said sections axially upon said lines of fold to position said axially moved sections in spaced relation to the remainder of the blank.

14. In a knock-down display device of the character described, an integral flat blank of bendable sheet material provided with an ornamental portion comprising two spaced areas with a slitted panel between them, the slitted panel being divided into a series of louvers by spaced slits, the slits permitting a shifting movement of one area relative to the other to position said areas in offset planes, whereby said louvers assume spaced positions in offset oblique planes.

15. In a knock-down display device of the character described, an integral flat blank of bendable sheet material provided with a medial display area, a border area spaced therefrom, and a slitted panel between said areas, the slitted panel being divided into a series of louvers by spaced slits which permit a shifting movement of the border area relative to the display area to position said areas in offset planes, whereby said louvers assume spaced positions in offset oblique planes.

16. In a knock-down display device of the character described, an integral flat blank of bendable sheet material provided with a substantially circular, medial display area, a border area of conforming shape spaced therefrom, and a slitted panel between said areas, said slitted panel being divided into a series of louvers by spaced slits which permit a relative rotative shifting movement of the border area, whereby said border area and display area assume positions in offset planes with said louvers spaced apart in offset oblique planes.

17. In a knock-down display device of the character described, an integral flat blank of bendable sheet material provided with a substantially circular, medial display area, a border area of conforming shape spaced therefrom, an outer border area of conforming shape spaced from the first-named border area, a slitted panel between the display area and the inner border area, and a slitted panel between the inner and outer border areas, each slitted panel being divided into a series of louvers by spaced slits which permit a rotative shifting movement of the border areas relative to the display area and a further rotative shifting movement of the outer border area relative to the inner border area, whereby said border areas and display area assume positions in three offset planes with the louvers of each slitted panel spaced apart in offset oblique planes.

RICHARD EATON PAIGE.